Patented Apr. 17, 1923.

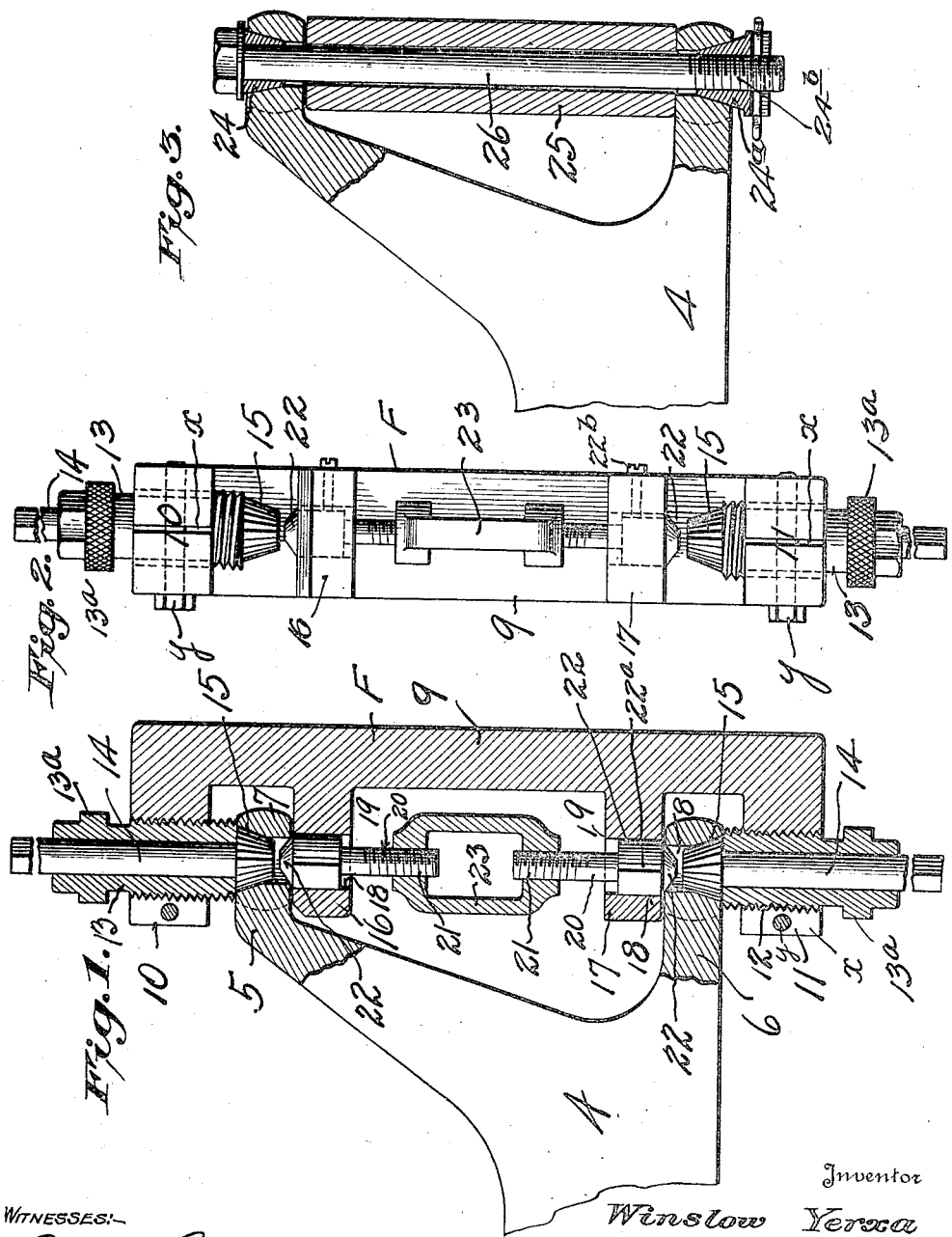

1,452,103

UNITED STATES PATENT OFFICE.

WINSLOW YERXA, OF DELBURNE, ALBERTA, CANADA.

REAMING TOOL.

Application filed February 17, 1922. Serial No. 537,267.

*To all whom it may concern:*

Be it known that I, WINSLOW YERXA, a citizen of Canada, and subject of the King of England, residing at Delburne, in the Province of Alberta, Canada, have invented certain new and useful Improvements in Reaming Tools, of which the following is a specification.

This invention relates to new and useful improvements in reaming devices generally and is particularly directed to a novel jig device for reaming worn axle bearings of motor vehicle steering wheels.

One of the principal objects of my invention is to provide a holder for a reamer which may be readily applied to the axle and center the reamer and maintain the latter in axial alignment with both bearings.

Another object is to provide a holder which supports two reamers, one for use with each bearing whereby a single attaching operation will suffice to center or align both reamers and maintain the latter in axial alignment with both bearings.

In the drawings:

Figure 1 is an elevation, partly in section, showing the application of my invention.

Fig. 2 is a rear elevation of the device; and

Fig. 3 is an elevation partly in section showing the bushed bearings and axle.

In motor vehicles, the bearings for each pivot bolt of the steering wheel knuckles become worn, and this necessitates the reaming of the bearings and the applications of bushings. My invention relates particularly to a reaming device which may be readily applied whereby one or both bearings may be accurately reamed prior to the application of a bushing or bushings.

Referring to the drawings, 4 indicates the usual front axle-bar of a motor vehicle which terminates at each end in spaced upper and lower bearing arms 5 and 6 respectively, the arm 5 being formed with a bearing 7 and the arm 6 with a bearing 8, said bearings being disposed in axial alignment.

The present jig device comprises a holder or frame F formed of metal having a body portion 9 from the upper and lower ends of which extend lateral arms 10 and 11. These arms are spaced apart a distance sufficient to embrace the bearing arms 5 and 6. Each arm is formed with a threaded opening 12 which is engaged by a threaded sleeve 13 and is also cut or slit as indicated at $x$ and tapped to receive a clamping screw $y$ so that when the sleeve becomes worn the screw can be tightened to prevent the sleeve from getting out of line. In each sleeve there is journaled a shank 14 of a reamer 15, the reamers being disposed between the arms 10 and 11 for engagements with the outer portions of the bearings. As will be observed from Figures 1 and 2 the threaded sleeves 13 bear against the rear face of the reamer head 15 thereby to hold the head of the reamer to its work. For the purpose of facilitating the adjustment of the sleeves 13 initially, the extending shank portions thereof are provided with knurled finger gripping flanges $13^a$. It will of course be understood that the threads of the sleeves 13 are of left hand pitch so that they will not turn to the right when the reamer is operating.

Integral with and extending laterally from the body portion 9 of said holder, are spaced upper and lower arms 16 and 17 which are adapted to be positioned between the bearing arms 5 and 6. Each of the arms 16 and 17 is formed with an opening 18 and with a counterbore or recess 19, said recesses opening towards the bearing arms. The openings 18 are disposed in axial alignment with the shanks 14 of the reamers. Slidably mounted in each opening 18 is a centering bolt 20 having a threaded shank 21 and a centering head 22, the heads being normally positioned in said recesses 19, and the shanks extending inwardly. The threads of the shanks are oppositely pitched and are connected by a turnbuckle 23. In order to prevent the head 22 from rotating in the bore 18 when the turn buckle 23 is manipulating, the side wall of the head 22 is preferably provided with a groove $22^a$ which receives the end of the locking screw $22^b$. Also, due to the relative depth of the head 18 it has a more or less extended bearing engagement in the bore 18 thereby preventing the same from canting or twisting when manipulated by the turn buckle.

The holder is positioned relative to the bearing arms of the axle so as to position the reamers directly above and below the bearings, and the turnbuckle is then operated to simultaneously move the centering bolts outwardly to engage the bearings and center the reamers relative to the bearings. Thus the centering bolts clamp the holder to the axle bar and maintain both reamers in axial alignment with both of said bearings.

After both bearings have been reamed, tapered bushing 24 and tapered nut 24ᵃ are positioned in the seats formed by the reamers, and the knuckle 25 and pivot bolt 26 are then readily assembled. It will of course be understood that the bushing 24 has a loose fit on the shank of the bolt 26 while the nut 24ᵃ engages threads 24ᵇ thereon.

What I claim is:

1. A jig for reaming the bearings of axle bars comprising a holder, a reamer carrier adjustably mounted in said holder, a reamer rotatable in said carrier, and extensible means for simultaneously engaging both bearings to maintain the reamer in axial alignment therewith.

2. A jig for reaming the bearings of axle bars comprising a holder, a reamer adjustably mounted on said holder, a pair of centering bolts carried by the holder and disposed in axial alignment with said bearings, and means for moving said bolts in opposite directions to engage the inner sides of said bearings and maintain the reamer in axial alignment therewith.

3. A jig for reaming the bearings of axle bars comprising a holder, a reamer mounted on said holder, a pair of centering bolts slidably mounted on said holder and disposed in axial alignment with said bearings, and a turnbuckle engageable with said bolts to simultaneously move said bolts in opposite directions to engage the bearings and maintain said reamer in axial alignment with said bearings.

4. A jig for reaming the bearings of axle bars comprising a holder, a reamer mounted on said holder, a pair of centering bolts slidably mounted on said holder and disposed in axial alignment with said bearings, said bolts being each formed with a centering head and a threaded shank, and a turnbuckle engageable with said shanks to simultaneously move the bolts in opposite directions and thereby engage the centering heads thereof with said bearings whereby said reamer will be maintained in axial alignment with said bearings.

5. A jig for reaming the bearings of axle bars comprising a holder having an arm extending laterally above the upper bearing and a pair of spaced arms extending laterally between said bearings, a reamer journaled in the upper arm of the holder, centering bolts movably mounted in said spaced arms of the holder, and means for moving said centering bolts to engage said bearings to align and maintain said reamer in axial alignment with said bearings.

6. A jig for reaming the bearings of axle bars comprising a holder having an arm extending laterally above the upper bearing and a pair of spaced arms extending laterally between said bearings, a reamer journaled in the upper arm of the holder, centering bolts slidably mounted in said spaced arms of the holder, said bolts being each formed with a centering head and a threaded shank, and a turnbuckle engageable with said shanks to simultaneously move the bolts and thereby engage the centering heads thereof with said bearings whereby said reamer will be maintained in axial alignment with said bearings.

7. A jig for reaming the bearings of axle bars comprising a holder, spaced reamers for the respective bearings mounted on said holder and disposed in longitudinal alignment, and means carried by the holder and engageable with said bearings to center and maintain said reamers in axial alignment with said bearings.

8. A jig for reaming the bearings of axle bars, and a reaming device for said bearings comprising a holder having spaced upper and lower laterally extending arms respectively disposed above and below said bearing arms, reamers respectively mounted in the arms of the holder for engagements with the outer portions of the bearings, and means carried by the holder and engageable with the inner portions of the bearings to center and maintain said reamers in axial alignment with said bearings.

In testimony whereof I hereunto affix my signature in the presence of two witnesses.

WINSLOW YERXA.

Witnesses:
H. E. MacDonald,
H. L. Fitts.